(12) United States Patent
Lin et al.

(10) Patent No.: US 7,136,323 B2
(45) Date of Patent: Nov. 14, 2006

(54) APPARATUS AND METHOD FOR GENERATING A VARIABLE-FREQUENCY CLOCK

(75) Inventors: Kevin Lin, Hsin-Tien (TW); Alex Chang, Hsin-Tien (TW)

(73) Assignee: VIA Technologies, Inc., Taipei (TW)

( * ) Notice: Subject to any disclaimer, the term of this patent is extended or adjusted under 35 U.S.C. 154(b) by 0 days.

(21) Appl. No.: 11/162,972

(22) Filed: Sep. 29, 2005

(65) Prior Publication Data

US 2006/0050602 A1    Mar. 9, 2006

Related U.S. Application Data

(63) Continuation-in-part of application No. 10/709,299, filed on Apr. 27, 2004, now abandoned.

(51) Int. Cl.
*G11C 8/00* (2006.01)
(52) U.S. Cl. .................. 365/233; 365/191; 327/115; 327/117
(58) Field of Classification Search ................. 365/233
See application file for complete search history.

(56) References Cited

U.S. PATENT DOCUMENTS 4,475,085 A * 10/1984 Yahata et al. ............... 327/160
4,623,846 A * 11/1986 LaMacchia ................. 327/114
4,819,164 A *  4/1989 Branson ...................... 713/501
4,893,271 A *  1/1990 Davis et al. ................ 713/501
5,319,771 A *  6/1994 Takeda ........................ 713/501
5,455,803 A * 10/1995 Kodama ...................... 365/233
5,528,307 A *  6/1996 Owada et al. .............. 348/497
5,974,557 A * 10/1999 Thomas et al. ............. 713/322
6,118,312 A *  9/2000 Shibazaki ................... 327/114
6,167,529 A * 12/2000 Dalvi .......................... 713/501
6,507,247 B1 *  1/2003 Langston ..................... 331/47
6,552,958 B1 *  4/2003 Shikata et al. .............. 365/233

* cited by examiner

*Primary Examiner*—Son L. Mai
(74) *Attorney, Agent, or Firm*—Squire, Sanders & Dempsey

(57) ABSTRACT

Apparatus and method for generating a variable-frequency clock is disclosed. A control state machine defines various commands and generates corresponding control signals. A variable-frequency clock generator then outputs the variable-frequency clock that has a specific pattern corresponding with the respective command, where the variable-frequency clock is constructed with a first clock and a second clock having a frequency different from the first clock. A control signals generator accordingly outputs the control signals that are also constructed with the first clock and the second clock.

20 Claims, 4 Drawing Sheets

APPARATUS AND METHOD FOR GENERATING A VARIABLE-FREQUENCY CLOCK

PRIORITY REFERENCE TO RELATED APPLICATION

This application is a continuation in part of and incorporates by reference U.S. patent application Ser. No. 10/709,299 filed Apr. 27, 2004 now abondoned.

FIELD OF THE INVENTION

The present invention generally relates to apparatus and method for generating a variable-frequency clock, and more particularly to apparatus and method for generating a variable-frequency clock to control a synchronous dynamic random access memory (SDRAM).

DESCRIPTION OF THE PRIOR ART

Synchronous dynamic random access memories (SDRAMs) or other types of dynamic random access memories (DRAMs) are typically used as the main memory of a computer or electronic device, in which a controller is necessarily embedded to control the SDRAM.

FIG. 1 shows a conventional SDRAM controller 10, which generates invariable- (or fixed-) frequency clock, and control signals (such as row address select signal (RAS_), column address select signal (CAS_), and Write enable signal (WE_)) to the SDRAM. The controller 10 typically includes an SDRAM control state machine 12 and a control signals generator 14. The SDRAM control state machine 12 defines some SDRAM commands and outputs corresponding control signals to the control signals generator 14. The control signals generator 14, under the dominance of the SDRAM control state machine 12, generates control signals which are constructed with the system clock (SDRAM_CLK or 1*CLK). Albeit the simplicity of the system architecture of the SDRAM controller 10, the invariability of the system clock to the SDRAM disadvantageously limits and affect the performance of the overall system, as will be understood from the following discussion.

FIG. 2 shows a timing diagram of the associated signals of FIG. 1. Under the invariable system clock (SDRAM_CLK), the SDRAM clock period Tcyc is fixed, and is used as the basic unit to construct all of the control signals to the SDRAM. The SDRAM receives commands (such as Active (ACT), Pre-charge (PRE), Write, and Read commands) and their corresponding control signals (such as RAS_, CAS_, and WE_). As shown in FIG. 2, when the ACT command is issued by the SDRAM control state machine 12, the control signals generator 14 generates control signals RAS_, CAS_, and WE_ which stay low, high, and high respectively. Then, when the Write command is issued, the control signals RAS_, CAS_, and WE_ become high, low, and low respectively. Thereafter, when the PRE command is issued, the control signals RAS_, CAS_, and WE_ become low, high, and low respectively. Finally, when the Read command is issued, the control signals RAS_, CAS_, and WE_ become high, low, and high respectively. As each of the control signals is constructed with the invariable system clock, the valid time, such as the valid write time $T_{WRITE}$ is thus edge-triggered. The SDRAM typically specifies minimum RAS_ to CAS_ delay time (tRCD) as 1.4*Tcyc, minimum RAS_ pre-charge time (tRP) as 1.4*Tcyc, and minimum command period (tRC) as 5*Tcyc. These parameters are also defined by the edges of the invariable system clock.

The control signals generator 14, under the dominance of the SDRAM control state machine 12, generates control signals which are constructed with the invariable system clock (SDRAM_CLK). In order to comply with the specified minimum parameters mentioned above, the operated time of the control signals is integer-multiple of the clock period Tcyc. Accordingly, redundant operated time is probably accumulated, and leads to SDRAM degradation. For example, as shown in FIG. 2, the tRCD is 2*Tcyc, the tRP is 2*Tcyc, and the tRC is 6*Tcyc, all of which comply with the SDRAM specified minimum tRCD (=1.4*Tcyc), the minimum tRP (=1.4*Tcyc), and the minimum tRC (=5*Tcyc) as mentioned before. Accordingly, the operated time of 1.2*Tcyc (i.e., 0.6*Tcyc+0.6*Tcyc) is redundantly accumulated in tRCD and tRP.

SUMMARY OF THE INVENTION

In view of the foregoing, it is an object of the present invention to efficiently reduce the operated time, therefore optimizing the SDRAM accessing time and improving the SDRAM performance.

According to the object, the present invention provides a method for generating a variable-frequency clock. Firstly, some commands and corresponding control signals are defined, followed by outputting the variable-frequency clock which is constructed with a first clock and a second clock having a frequency different from the first clock. The variable-frequency clock has a specific pattern corresponding with the respective command. The control signals which are constructed with the first clock and the second clock are accordingly outputted.

According to another embodiment, the present invention provides apparatus for generating a variable-frequency clock, in which a control state machine defines various commands and generates corresponding control signals. A variable-frequency clock generator then outputs the variable-frequency clock that has a specific pattern corresponding with the respective command, where the variable-frequency clock is constructed with a first clock and a second clock having a frequency different from the first clock. A control signals generator accordingly outputs the control signals that are also constructed with the first clock and the second clock.

DETAILED DESCRIPTION OF THE INVENTION

Figure 3:
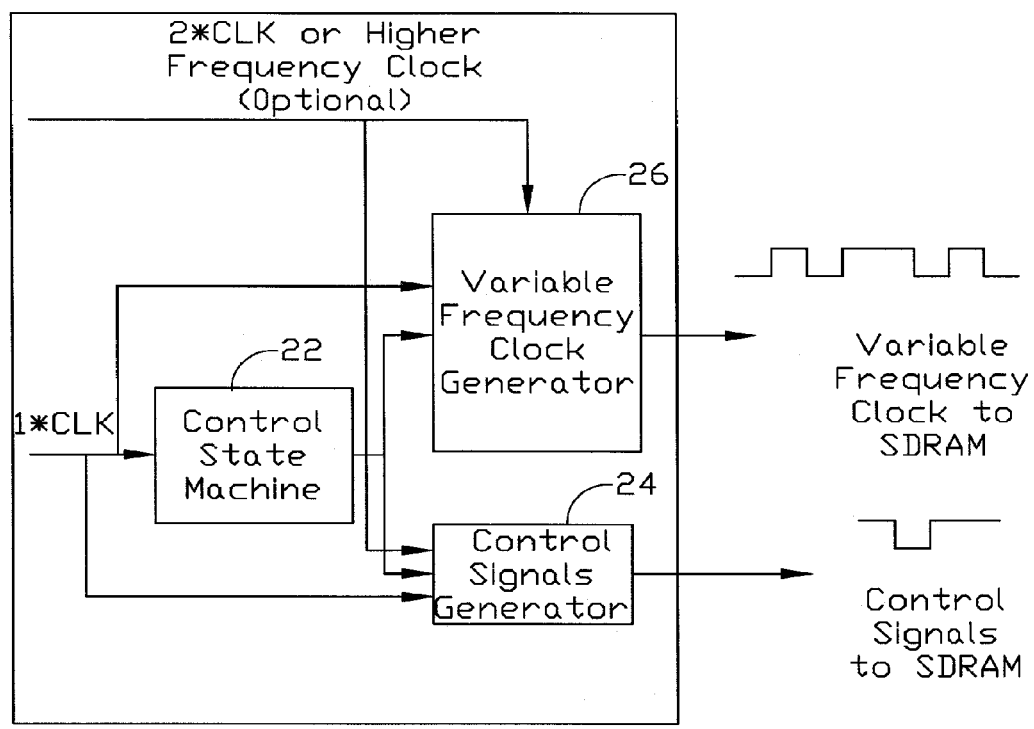
FIG. 3 shows a block diagram illustrating apparatus and method for generating a variable-frequency clock to a synchronous dynamic random access memory (SDRAM) according to one embodiment of the present invention.
Figure 4:
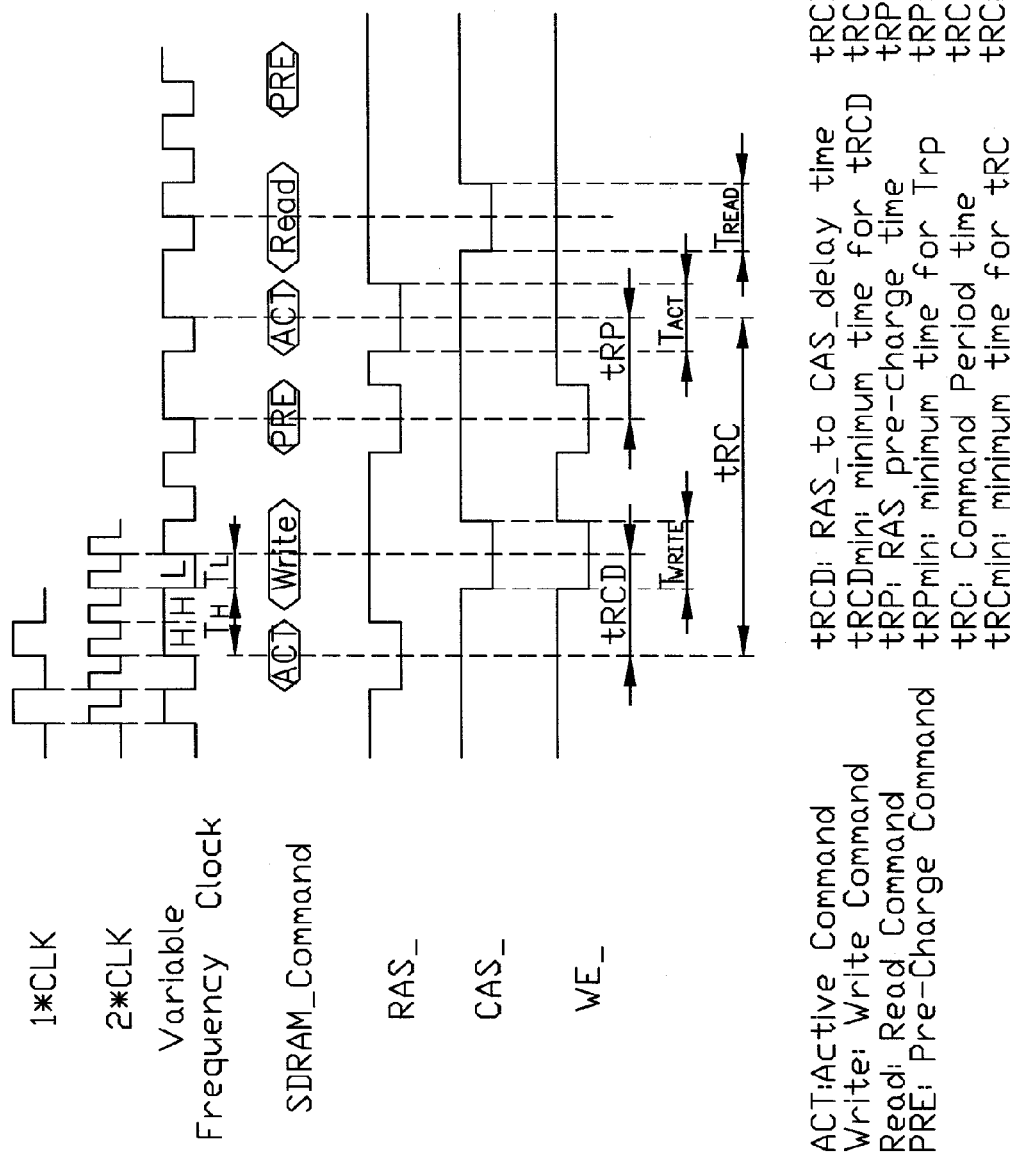
FIG. 4 shows a timing diagram of the associated signals of FIG. 3 according to the embodiment of the present invention.

FIG. 3 shows a block diagram illustrating apparatus and method for generating a variable-frequency clock to a synchronous dynamic random access memory (SDRAM) according to one embodiment of the present invention. FIG. 4 shows a timing diagram of the associated signals of FIG. 3 according to the embodiment of the present invention. Although the present invention is applied to SDRAM in the present embodiment, it is appreciated that the present invention could be well adapted to other types of DRAM. The apparatus or controller shown in FIG. 3 primarily includes a control state machine 22, a control signals generator 24, and a variable-frequency clock generator 26. The control state machine 22 defines some SDRAM commands and outputs corresponding control signals to the control signals generator 24. The control state machine 22 controllably decides which command is issued at a particular time. The control state machine 22, moreover, directs the variable-frequency clock generator 26 to decide which frequency clock is used and how the variable-frequency clock output is formed or patterned at a particular time.

The variable-frequency clock generator 26 receives system clock (1*CLK) and other clock with double (2*CLK) or higher frequency. The variable-frequency clock generator 26 then outputs a variable-frequency clock, which has a pattern corresponded with command issued by the control state machine 22. For example, when a specific command, such as Active (ACT) or Pre-charge (PRE) command, is issued by the control state machine 22, the variable-frequency clock generator 26 then outputs a clock having a pattern which is constructed with two high (H) and one low (L) as designated as $T_H$ and $T_L$ respectively, each of which having double frequency (2*CLK) as shown in FIG. 4. When another type of command, such as Write command or Read command, is issued, the variable-frequency clock generator 26 then outputs a clock having the basic frequency of the system clock (1*CLK).

The control signals generator 24, under the dominance of the control state machine 22, generates control signals which are constructed with the system clock (1*CLK), the double-frequency clock (2*CLK), or higher-frequency clock. For example, when a specific command, such as ACT or PRE command, is issued by the control state machine 22, the control signals generator 24 generates control signals which are constructed with the double-frequency clock (2*CLK). When another type of command, such as Write or Read command, is issued, the control signals generator 24 generates control signals which are constructed with the system clock (1*CLK). As illustrated in FIG. 4, before the Write command is issued, the control signals such as row address select signal (RAS_), column address select signal (CAS_), and Write enable signal (WE_) remain at high (H). Subsequently, after the Write command is issued, the CAS_ and WE_ signals change to low (L). Therefore, the valid write time $T_{WRITE}$ is triggered at a rising edge of the double-frequency clock (2*CLK). As further illustrated in FIG. 4, the control signals RAS_, CAS_, and WE_ stay low, high, and high respectively during the issuance of the ACT command; they stay high, low, and low respectively during the issuance of the Write command; they stay low, high, and low respectively during the issuance of the PRE command; and they stay high, low, and high respectively during the issuance of the Read command.

Specifically, according to the embodiment illustrated in FIG. 4, the SDRAM specifies minimum RAS_ to CAS_ delay time (tRCD) as 1.4*Tcyc, where Tcyc is the clock period of the system clock (1*CLK). The SDRAM also specifies minimum RAS_ pre-charge time (tRP) as 1.4*Tcyc, and minimum command period (tRC) as 5*Tcyc. As described above, after a specific command is determined, the generated variable-frequency clock therefore has a pattern corresponded with the specific command. For the embodiment shown in FIG. 4, the ACT or PRE command has a pattern constructed with the double-frequency clock (2*CLK). The Write or Read command has a pattern constructed with the original system clock (1*CLK).

With respect to the generated control signals, when the ACT command is issued by the control state machine 22, the control signals generator 24 generates control signals which are constructed with the double-frequency clock (2*CLK), and the control signals RAS_, CAS_, and WE_ stay low, high, and high respectively. Then, when the Write command is issued, the control signals RAS_, CAS_, and WE_ become high, low, and low respectively at the rising edge of the double-frequency clock (2*CLK). In other words, the valid write time $T_{WRITE}$ is triggered at a rising edge of the double-frequency clock (2*CLK). Thereafter, when the PRE command is issued, the control signals RAS_, CAS_, and WE_ become low, high, and low respectively, and are constructed with the double-frequency clock (2*CLK). Further, when another ACT command is issued, the control signals RAS_, CAS_, and WE_ become low, high, and high respectively, and the valid active time $T_{ACT}$ is triggered at a rising edge of the double-frequency clock (2*CLK). Finally, when the Read command is issued, the control signals RAS_, CAS_, and WE_ become high, low, and high respectively at the rising edge of the double-frequency clock (2*CLK). In other words, the valid read time $T_{READ}$ is also triggered at a rising edge of the double-frequency clock (2*CLK).

Figure 1:
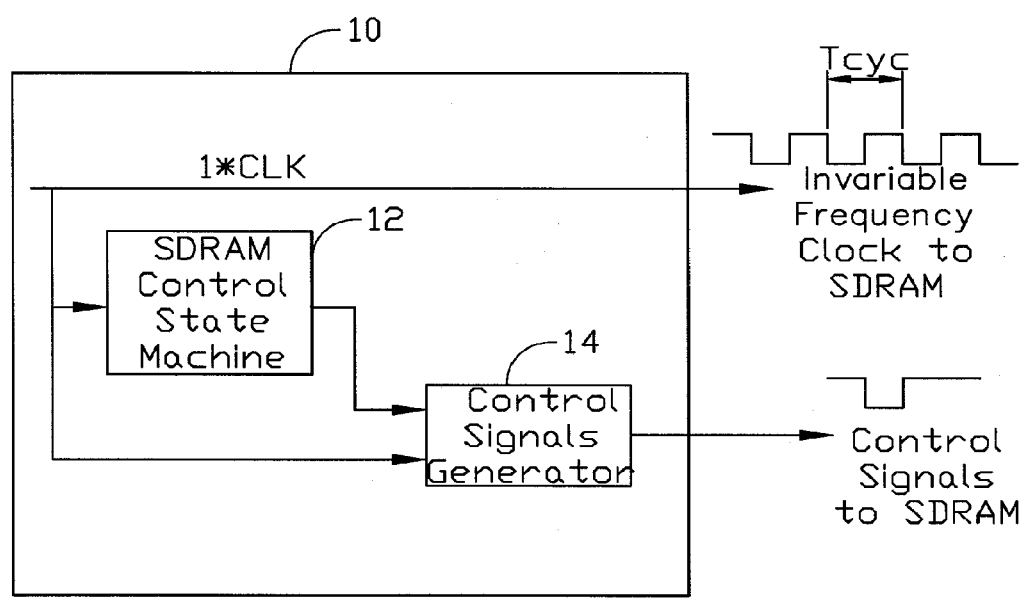
FIG. 1 shows a conventional SDRAM controller, which generates invariable-frequency clock and control signals to the SDRAM.
Figure 2:
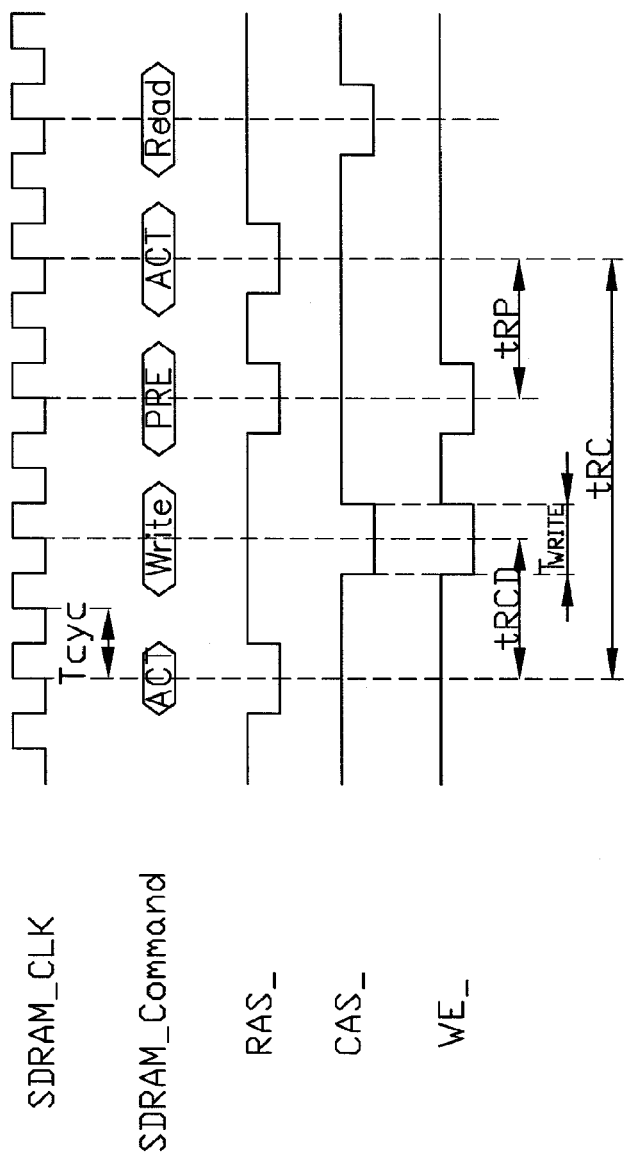
FIG. 2 shows a timing diagram of the associated signals of FIG. 1.

For the embodiment illustrated in FIG. 4, the RAS_ to CAS_ delay time (tRCD) is 1.5*Tcyc, the RAS_ pre-charge time (tRP) is 1.5*Tcyc, and the command period (tRC) is 5*Tcyc, all of which comply with the SDRAM specified minimum tRCD (=1.4*Tcyc), the minimum tRP (=1.4*Tcyc), and the minimum tRC (=5*Tcyc) as mentioned before. Compared with that in the FIG. 2, the operated time of 0.2*Tcyc (i.e., 0.1*Tcyc+0.1*Tcyc) which is accumulated in tRCD and tRP of the present invention is substantially less than the operated time of 1.2*Tcyc (i.e., 0.6*Tcyc+0.6*Tcyc) which is accumulated in tRCD and tRP in the prior art. As the operated time is substantially reduced in the present invention, the performance of the SDRAM is greatly improved.

Although the embodiment discussed above utilizes the system clock and the double-frequency clock (2*CLK), it is appreciated that other frequency clock, such as triple-frequency clock, quadruple-frequency clock, or higher frequency clock could also be used to generate the variable-frequency clock and the control signals. The apparatus as shown in FIG. 3 could be embedded in a chip or chips to control an external SDRAM. The control state machine 22, the control signals generator 24, or/and the variable-frequency lock generator 26 could be implemented by a traditional logic circuit design. Moreover, the variable-frequency clock generator and the control signals generator could also be adapted for applications other than the SDRAM.

According to the above disclosure of the present invention, the control signals are constructed with variable-frequency clock to optimize the SDRAM accessing time, instead of being constructed with fixed-frequency clock as in the prior art.

Although specific embodiments have been illustrated and described, it will be appreciated by those skilled in the art that various modifications may be made without departing from the scope of the present invention, which is intended to be limited solely by the appended claims.

We claim:

1. A method for generating a variable-frequency clock, comprising:
   defining a plurality of commands and generating corresponding control signals;
   outputting the variable-frequency clock which is constructed with a first clock and a second clock having a frequency different from the first clock, said variable-frequency clock having a specific pattern corresponding with the respective command; and
   outputting the control signals which are constructed with the first clock and the second clock.

2. The method of claim 1, wherein said second clock is double the frequency of the first clock.

3. The method of claim 1, wherein said specific pattern is constructed with the second clock with respect to one of the commands, and is constructed with the first clock with respect to another of the commands.

4. The method of claim 3, wherein said specific pattern is defined as a sequence of high level (H), high level (H), and low level (L).

5. The method of claim 1, wherein said control signals are constructed with the second clock with respect to one of the commands, and is constructed with the first clock with respect to another of the commands.

6. The method of claim 5, wherein said control signals corresponding to one of the commands is maintained at high level (H), and is then changed to low level (L) when another of the commands is issued.

7. The method of claim 1, wherein said variable-frequency clock and the control signals control a synchronous dynamic random access memory (SDRAM), and said commands at least include an active (ACT) command and a pre-charge (PRE) command.

8. Apparatus for generating a variable-frequency clock and control signals to an SDRAM, comprising:
   a control state machine, which defines a plurality of commands and generating corresponding control signals;
   a variable-frequency clock generator, which outputs the variable-frequency clock that is constructed with a first clock and a second clock having a frequency different from the first clock, said variable-frequency clock having a specific pattern corresponding with the respective command; and
   a control signals generator, which outputs the control signals that are constructed with the first clock and the second clock.

9. The apparatus of claim 8, wherein said second clock is double the frequency of the first clock.

10. The apparatus of claim 8, wherein said specific pattern is constructed with the second clock with respect to one of the commands, and is constructed with the first clock with respect to another of the commands.

11. The apparatus of claim 10, wherein said specific pattern is defined as a sequence of high level (H), high level (H), and low level (L).

12. The apparatus of claim 8, wherein said control signals are constructed with the second clock with respect to one of the commands, and is constructed with the first clock with respect to another of the commands.

13. The apparatus of claim 12, wherein said control signals corresponding to one of the commands is maintained at high level (H), and is then changed to low level (L) when another of the commands is issued.

14. A method for generating a variable-frequency clock and control signals to an SDRAM, comprising:
   outputting the variable-frequency clock and the control signals correspondingly with a plurality of commands, wherein said variable-frequency clock and the control signals are constructed with a first clock and a second clock having a frequency different from the first clock.

15. The method of claim 14, wherein said second clock is double the frequency of the first clock.

16. The method of claim 14, wherein said variable-frequency clock has a specific pattern corresponding with the respective command.

17. The method of claim 16, wherein said specific pattern is constructed with the second clock with respect to one of the commands, and is constructed with the first clock with respect to another of the commands.

18. The method of claim 17, wherein said specific pattern is defined as a sequence of high level (H), high level (H), and low level (L).

19. The method of claim 16, wherein said control signals are constructed with the second clock with respect to one of the commands, and is constructed with the first clock with respect to another of the commands.

20. The method of claim 19, wherein said control signals corresponding to one of the commands is maintained at high level (H), and is then changed to low level (L) when another of the commands is issued.

* * * * *